United States Patent
Kopetz et al.

(10) Patent No.: US 10,585,781 B2
(45) Date of Patent: Mar. 10, 2020

(54) METHOD FOR DEBUGGING SOFTWARE COMPONENTS IN A DISTRIBUTED, TIME-CONTROLLED REAL TIME SYSTEM

(71) Applicant: FTS COMPUTERTECHNIK GMBH, Vienna (AT)

(72) Inventors: Hermann Kopetz, Baden (AT); Stefan Poledna, Klosterneuburg (AT)

(73) Assignee: TTTech Auto AG, Vienna (AT)

( * ) Notice: Subject to any disclaimer, the term of this patent is extended or adjusted under 35 U.S.C. 154(b) by 0 days.

(21) Appl. No.: 15/738,804

(22) PCT Filed: Jun. 16, 2016

(86) PCT No.: PCT/AT2016/050207
§ 371 (c)(1),
(2) Date: Jan. 11, 2018

(87) PCT Pub. No.: WO2016/205841
PCT Pub. Date: Dec. 29, 2016

(65) Prior Publication Data
US 2018/0196728 A1     Jul. 12, 2018

(30) Foreign Application Priority Data

Jun. 25, 2015   (AT) .................... 50550/2015

(51) Int. Cl.
| | | |
|---|---|---|
| G06F 11/36 | (2006.01) | |
| G06F 8/70 | (2018.01) | |
| H04L 29/08 | (2006.01) | |

(52) U.S. Cl.
CPC .............. *G06F 11/362* (2013.01); *G06F 8/70* (2013.01); *H04L 67/10* (2013.01)

(58) Field of Classification Search
CPC ............... G06F 11/362; G06F 11/3632; G06F 11/3648; G06F 11/3656; G06F 11/3664; G06F 8/70; H04L 67/10
(Continued)

(56) References Cited

U.S. PATENT DOCUMENTS

| | | | | |
|---|---|---|---|---|
| 6,021,457 A | * | 2/2000 | Archer | ................ G06F 11/3404 710/260 |
| 6,941,492 B1 | * | 9/2005 | Ezra | ....................... G06F 11/362 714/27 |

(Continued)

FOREIGN PATENT DOCUMENTS

| | | |
|---|---|---|
| WO | 2014/094023 A1 | 6/2014 |
| WO | 2015/131214 A1 | 9/2015 |

OTHER PUBLICATIONS

Steinhammer, K., et al., A Time-Triggered Ethernet (TTE) Switch, Proceedings of the conference on Design, automation and test in Europe, 2006, pp. 794-799, [retrieved on Sep. 4, 2018], Retrieved from the Internet: <URL:http://dl.acm.org/>.*

(Continued)

*Primary Examiner* — Geoffrey R St Leger
(74) *Attorney, Agent, or Firm* — Eversheds Sutherland (US) LLP

(57) ABSTRACT

The invention relates to a method for debugging software components of a distributed real-time software system, wherein the target hardware comprises computer nodes and the development system comprises one or more computers. According to the invention, an enhanced development system is formed, in which enhanced development system the computer nodes of the target hardware are connected to the computers of the development system via one or more time-controlled distributer units, wherein the enhanced development system has a sparse global time of known precision, wherein the computer nodes of the target hard- (Continued)

ware exchange messages with the computers of the development system via one or more distributer units, and wherein, in a frame, a software component on the target hardware and, temporally parallel thereto, a software component in the development system are supplied with the same input data and executed, wherein the activation signals are triggered at the start of the two executions of the software component in the same space tick of the global time, and wherein the software component executed in the development system is enhanced in such a way that, during its execution, selected intermediate results are written on an external data memory.

3 Claims, 1 Drawing Sheet

(58) Field of Classification Search
USPC .................................................. 717/124–135
See application file for complete search history.

(56) References Cited

U.S. PATENT DOCUMENTS

| 8,464,065 | B2 | 6/2013 | Kopetz | |
|---|---|---|---|---|
| 8,762,959 | B2* | 6/2014 | Singonahalli | G06F 11/3668 |
| | | | | 717/131 |
| 9,407,696 | B2 | 8/2016 | Poledna | |
| 9,614,744 | B2 | 4/2017 | Poledna | |
| 2003/0140333 | A1 | 7/2003 | Odaka et al. | |
| 2005/0053018 | A1* | 3/2005 | Hoppe-Boeken | H04L 51/04 |
| | | | | 370/260 |
| 2009/0132999 | A1* | 5/2009 | Reyes | G06F 11/3668 |
| | | | | 717/124 |
| 2011/0296183 | A1* | 12/2011 | Banerjee | G06F 21/33 |
| | | | | 713/170 |
| 2012/0278790 | A1 | 11/2012 | Bates | |
| 2015/0078399 | A1 | 3/2015 | Poledna et al. | |
| 2015/0242293 | A1* | 8/2015 | Segger | G06F 11/26 |
| | | | | 714/33 |
| 2016/0147568 | A1 | 5/2016 | Poledna et al. | |
| 2018/0102957 | A1* | 4/2018 | Smith | G06F 11/3688 |

OTHER PUBLICATIONS

Kopetz, H., et al., The Time-Triggered Ethernet (TTE) Design, Eighth IEEE International Symposium on Object-Oriented Real-Time Distributed Computing (ISORC'05), 2005, 12 pages, [retrieved on May 2, 2019], Retrieved from the Internet.*

Office Action issued in Austrian Application No. A 50550/2015, dated Oct. 9, 2015 (4 pages).

International Search Report and Written Opinion for PCT/AT2016/050207, dated Nov. 10, 2016 (11 pages).

Kopetz, H., "Why do we need a Sparse Global Time-Base in Dependable Real-time Systems?". 2007 International IEEE Symposium on Precision Clock Synchronization (ISPCS) for Measurement, Control and Communication, Oct. 1-3, 2007, Vienna, Austria. pp. 13-17.

Kopetz, H. "Real-time Systems: Design Principles for Distributed Embedded Applications". Springer Science +Business Media, 2011, New York/USA. Chapter 3, pp. 62-64; Chapter 6.3, p. 153.

Kopetz, H., Real-Time Systems: Design Principles for Distributed Embedded Applications, 2002, Chapter 12, pp. 252-256.

Kopetz, H. Real-time Systems-Design Principles for Distributed Embedded Applications. Springer Verlag, 2011, Chapter 3, pp. 52-56; Chapter 12, 302-304.

* cited by examiner

METHOD FOR DEBUGGING SOFTWARE COMPONENTS IN A DISTRIBUTED, TIME-CONTROLLED REAL TIME SYSTEM

The invention relates to a method for debugging software components of a distributed real-time software system, wherein the target hardware comprises computer nodes, and the development system comprises one or more computers.

Within the scope of the architectural design of a large real-time system, a given statement of object is subdivided into a number of software components. A software component is a part of a software system that exchanges data and control signals with other parts of the software system (other software components) over specified interfaces. Within the framework of the architectural design, a functional specification is prepared for each software component.

A functional specification of a software component describes the syntax and the semantics of the input data, the output data and the internal condition of the software component as well as the processing algorithm, which defines how the output data and the next internal condition are to be calculated from the input data and the initial internal condition.

With a major project, independent project teams develop the program code for the corresponding software component from the functional specifications for each software component. Program development normally takes place on a development system, which supports convenient tools for testing and debugging the program code. To facilitate program development, the development system not only supports more functions than the target hardware, for example additional functions for interactive simulation of the course of the programs.

We refer to the execution of a software component on the development system, for example, on a personal computer of the development system, as a simulation process.

We refer to the version of the software component that must maintain the required real-time constraints on the target hardware as the real-time version of a software component. The term target hardware is understood to refer to the distributed hardware environment used in a planned product.

We refer to the execution of the real-time version of a software component on the target hardware as an operative process. In a real-time system, the operative processes must comply not only with the functional specifications but also with real-time constraints defined by the formulation of the problem. The processing time of an operative process on the target hardware depends on the efficiency of this hardware.

In a time-triggered real-time system, the software components are activated periodically, and the data flow between the software components is implemented with periodic time-triggered TT messages (TT="time-triggered"). The FTS patent application disclosed in [1] describes the structure of such a periodic system and explains how to determine the processing time of an operative process on the target hardware and the transport times of the TT messages exchanged between the software components on the target hardware.

In real-time data processing, a frame is a recurring increment on the time axis, during which a periodic process is executed by a computer.

A processing frame begins with reading the input data and the internal condition of a process and ends with production of output data and a new internal condition.

A communication frame begins with the start of transmission of a message in the transmitting process and ends with completion of the message transported in the receiving process.

Within the framework of debugging a software component, design errors inside a software component must be localized and eliminated. If, within the scope of testing a software component using specific input data, the final results on the software component do not meet the specified requirements with regard to values or time range and are therefore recognized as faulty, then interim results must be verified on the component to ascertain which defective software commands are causing the observed errors in the final results for the software component. To enable such verification of the interim results, the software component must be expanded by the addition of debugging aids.

Various debugging aids are known from the technical literature [4]: setting stopping points in the software component to be able to verify the instantaneous value of variables, output of interim results for important variables to an external data memory or setting Boolean conditions between variables that must be met for proper execution of a program.

Expansion of a software component by adding debugging aids changes the running runtime performance of a software component. In real-time systems, this altered running runtime performance may be the cause for an error that occurs.

One object of the present invention is to provide a solution to this problem.

This object is achieved with a method as defined in the introduction by the fact that an expanded development system is formed according to the invention, the computer nodes of the target hardware in said expanded development system being connected to the computers of the development system via one or more time-triggered distributor units, wherein the expanded development system has sparse global time of a known precision, wherein the computer nodes of the target hardware exchange messages with the computers of the development system over one or more distributor units, and wherein a software component on the target hardware is supplied with the same input data in one frame and, in parallel with that chronologically in the development system, supplied with the same input data and executed, wherein the activation signals are triggered at the start of the two executions of the software component with the same sparse tick of global time, and wherein the software component executed in the development system is expanded, so that interim results selected during its execution are written to an external data memory.

It is proposed that two versions of a software component should be executed with the same input data simultaneously in a distributed real-time system, a real-time version of a software component on the target hardware and an expanded simulation version of a software component on the development system.

For example, the behavior of a vehicle should be tested under very different driving conditions (for example, dry or wet roads, ice, snow) in real-time operation as part of a field test of the software of a vehicle. If an error occurs during such a field test, one must ascertain which program error within a component is the cause of this error. A dilemma occurs here. To discover the cause of an error in a component, the component must be equipped with debugging aids. However, these debugging aids alter the real-runtime performance of the component. This problem can be eliminated, for example, with the help of the present invention.

A development system, which is expanded by adding the target hardware and in which messages can be exchanged between the development system and the target hardware, while maintaining given real-time constraints is known as an expanded development system.

It may be advantageous if the results of the execution of the real-time version of a software component are transferred to a downstream process on the target hardware, and in parallel with that, are transferred via a distributor unit to the development system.

It may be advantageous if a process in the development system is checked for whether the results of the execution of the real-time version of the software component correspond to the stated requirements and whether an error message is produced on detection of an error.

It may be expedient if a process in the development system is checked for whether the results of the execution of the real-time version of the software component are identical with the results of the execution of the software component on the development system carried out in parallel chronologically and whether an error message is produced if this detects a deviation in the two results from one another.

The expanded simulation version of the software component contains software commands which write interim results, in addition to the input data, to an external data memory, in order to be able to reconstruct the control flow subsequently in the software component in the event of an error. Due to this expansion, the runtime performance of the expanded simulation version of the software component executed on the development system is altered.

This change in the runtime performance is irrelevant for the target hardware because the real-time version of the software component executed on the target hardware provides the results promptly for the remaining course of the real-time system. Continuous test operation under real-time conditions is thus possible with this method.

A process provided in the development system verifies whether the results of a test run conform to the given requirements and whether the results obtained by the target hardware via a distributor unit are identical to the results calculated on the development system. If there is an error or deviation, an error message is output. It is then possible to pursue the internal program sequence of this test case in the program code inside the component offline on the basis of the interim results saved in order to search for the cause of the error.

The invention is explained in greater detail below on the basis of the drawing, in which.

The following specific example relates to one of the many possible implementations of the present invention.

Figure 1:
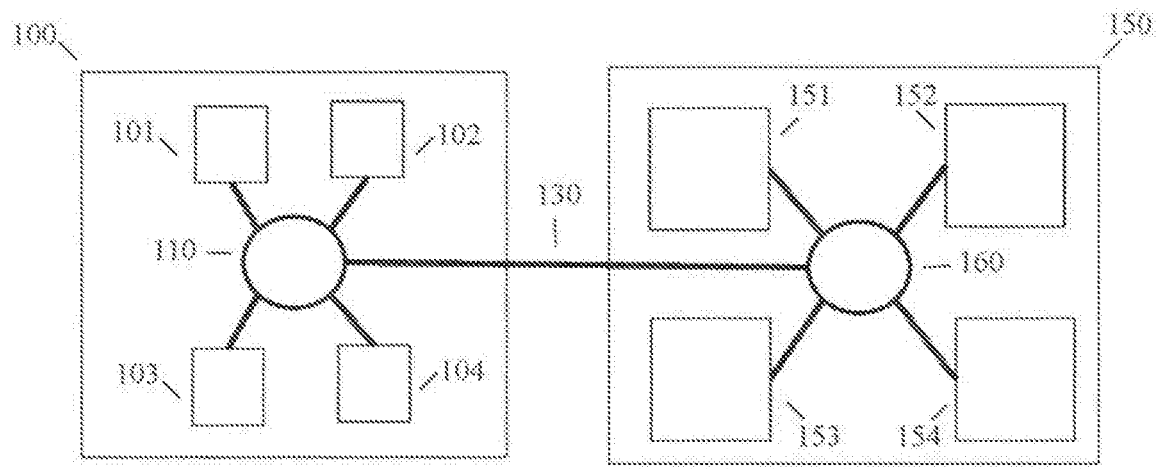
FIG. 1 shows the structure of an exemplary expanded development system.

FIG. 1 illustrates the structure of an enlarged development system consisting of a target hardware 100 and a development system 150. The two systems are connected over a communication channel 130, on which time-triggered messages can be conveyed.

In FIG. 1 the target hardware 100 consists of four computer nodes 101, 102, 103, 104, which can exchange time-triggered messages with one another over a distributor unit 110 and with the development system 150 over the communication channel 130. In a computer node, for example, in the computer node 101, several partitions can be provided by the TT platform of a hypervisor for execution of software components.

The development system 150 illustrated in FIG. 1 consists of four computers, for example, personal computers 151, 152, 153, 154, which can exchange time-triggered messages with one another via a time-triggered distributor unit 160 and with the target hardware over the communication channel 130.

Figure 2:
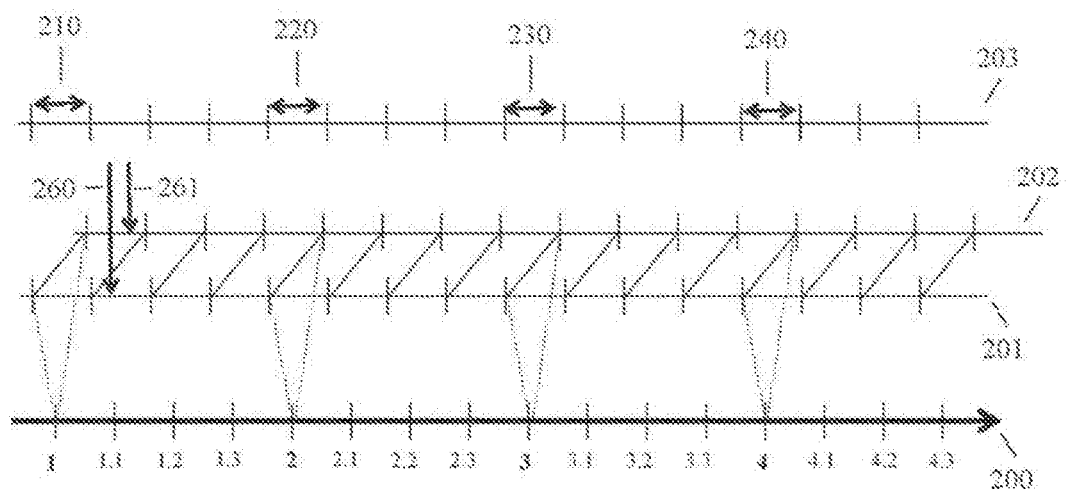
FIG. 2 shows the design of a sparse global time.

FIG. 2 shows the structure of the global time. The advance of global time is represented on the abscissa 200. The cross bars on the lines 201 and 202 represent ticks of clocks 201 and 202.

It is impossible in principle to accurately synchronize clocks in a distributed system. Therefore, the corresponding ticks of synchronized clocks interconnected by dotted lines in FIG. 2 may differ from one another. This deviation is known as a synchronization error. The maximum synchronization error in the corresponding ticks of two clocks of an ensemble of clocks, which depends on the synchronization algorithm and the quality of the clocks, is referred to as the precision of a clock ensemble. Precision subsequently determines the granularity of a digital time base [4]. Digitization results in a digitization error of the same order of magnitude as the synchronization error.

Based on a synchronization error and the digitization error, it is possible for the result 260, which occurs before the result 261 and has received the time stamp 1.1 from the clock 201, to have a later time stamp than the result 260 observed by the clock 202 and having the time stamp 1.0. Since 1.1>1.0, it would be assumed incorrectly on the basis of the time stamp that the result 260 occurred after the result 261.

To prevent this inconsistency, in the expanded development system a sparse time base 203 is introduced, where sparse results can occur only in the intervals 210, 220, 230 and 240, and where the identifier of these intervals—the global time stamp—is provided by using the integers 1, 2, 3 and 4. Since the time interval of sparse results is greater than the sum of the synchronization errors and the digitization errors, it is possible to determine the temporal order of sparse results in the distributed system consistently on the basis of their time stamp.

Result A is then simultaneous with result B only when it holds that (global sparse time stamp of $A$)=(global sparse time stamp of $B$).

To enable continuous real-time operation of the expanded development system, the expanded simulation version of the software component, which is executed on the development system and the real-time version of the software component, which is executed on the target hardware must be activated at the same tick of the global sparse time. The two software versions must provide the same input data. The real-time version of the software component must provide its result within its allotted processing frame. The point in time of completion of the result of the expanded simulation version of the software component is not limited in time to the fact that these results are irrelevant for the remaining course of the real-time system.

The present invention thus permits continuous testing and debugging of the software of a large software system under real-time conditions and, after an error or fault is detected in a software component, it provides the required information for determining the cause of the error within this software component.

LITERATURE CITED

[1] PCT application PCT/AT2015/050055 from the company FTS Computertechnik GmbH of Mar. 3, 2015:

*Method for distributed development of process programs of a distributed real-time software system on a distributed development hardware.*

[2] U.S. Patent Application 20120278790 Bates. *Collaborative Software Debugging in a Distributed System with Real-Time Variable Modification Indicators*. Published Nov. 1, 2012.

[3] U.S. Patent Application 20030140333. Odaka et al., *Integration of Computer System Components*. Published Jul. 24, 2003.

[4] Kopetz, H. *Real-time Systems-Design Principles for Distributed Embedded Applications*. Springer Verlag, 2011.

The invention claimed is:

1. A method for debugging software components of a distributed real-time software system, wherein a target hardware comprises computer nodes, and a development system comprises one or more computers, the method comprising:

forming an expanded development system for testing a vehicle under different driving conditions, wherein the computer nodes of the target hardware in said expanded development system are connected to the one or more computers of the development system via one or more time-triggered distributor units, wherein the expanded development system has a sparse global time with a known precision, wherein the computer nodes of the target hardware exchange messages with the one or more computers of the development system over the one or more time-triggered distributor units, and wherein, in a frame, a real-time version of a software component on the target hardware and, in chronological parallel, an expanded simulation version of the software component on the development system are supplied with identical input data and are executed as two executions, wherein activation signals at a start of the two executions of the software component are triggered at identical sparse ticks of the global time, and wherein the expanded simulation version of the software component executed in the development system is expanded such that, during its execution, selected interim results are written to an external data memory, and wherein results of the execution of the real-time version of the software component are transferred to a downstream process on the target hardware and, in parallel with that, to the development system via the one or more time-triggered distributor units, and wherein a process in the development system is checked for whether the results of the execution of the real time version of the software component meet specific requirements with regard to time range.

2. The method according to claim 1, wherein the process in the development system is checked for whether the results of the execution of the real time version of the software component correspond to given requirements and whether they produce an error message on detection of an error.

3. The method according to claim 1, wherein the process in the development system is checked for whether the results of the execution of the real-time version of the software component are identical to the results of the chronologically parallel execution of the expanded simulation version of the software component on the development system, and whether they produce an error message on detection that the two results deviate from one another.

* * * * *